Sept. 8, 1970 H. PAPST 3,527,969
SOUNDPROOFED HOUSING FOR ELECTRIC MOTORS
Filed Oct. 28, 1968            2 Sheets-Sheet 1
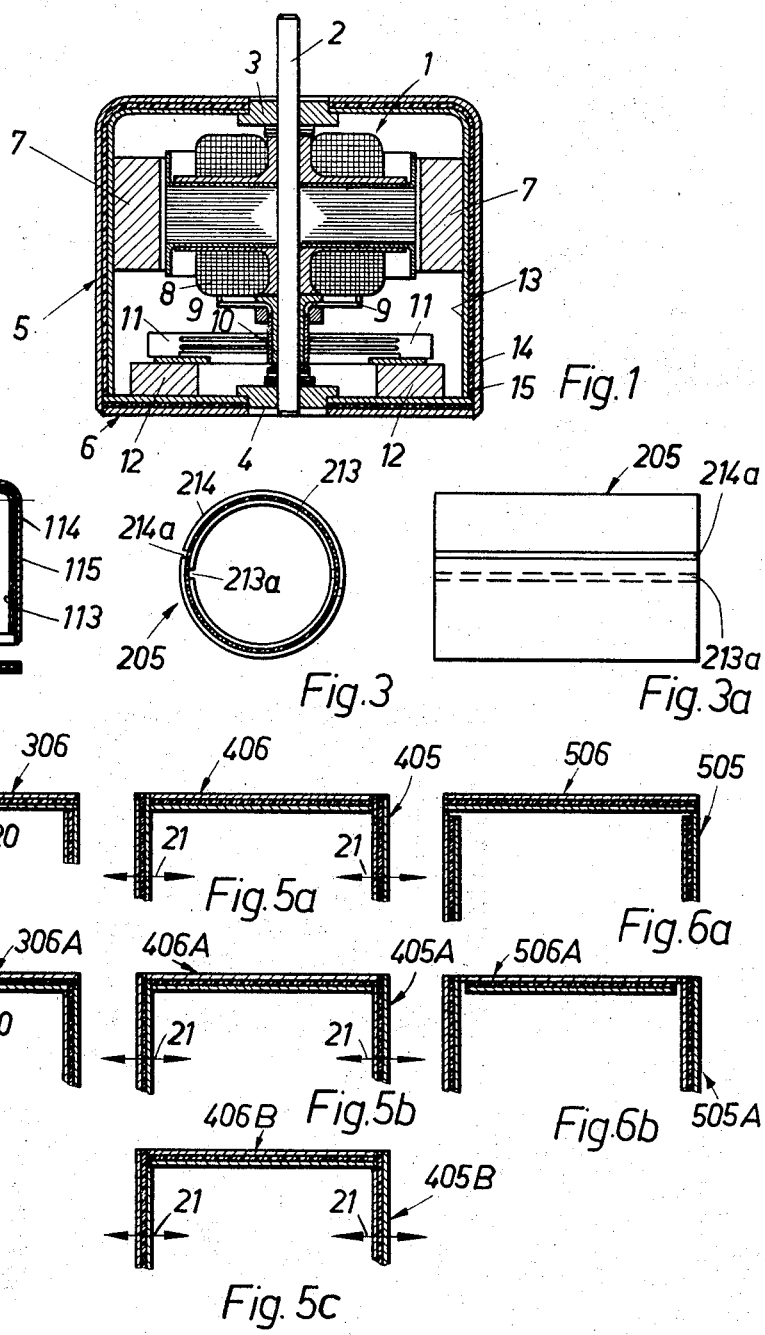
Inventor:
Hermann Papst
by Michael S. Stuck
his Attorney

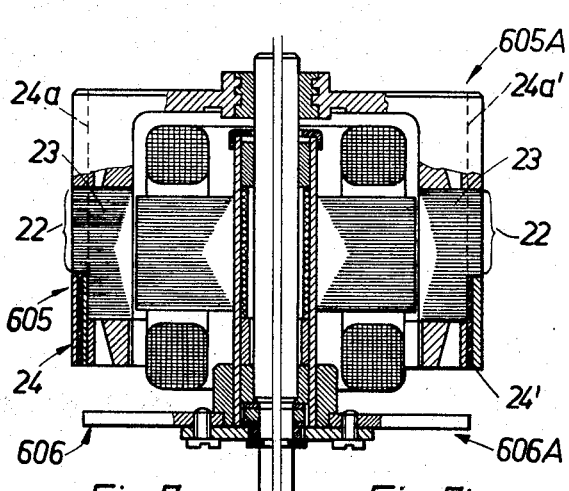
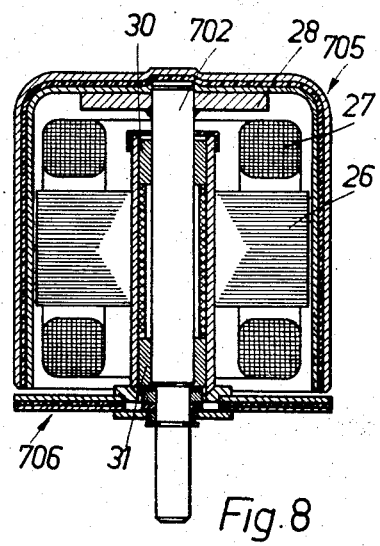
Fig. 7a  Fig. 7b  Fig. 8
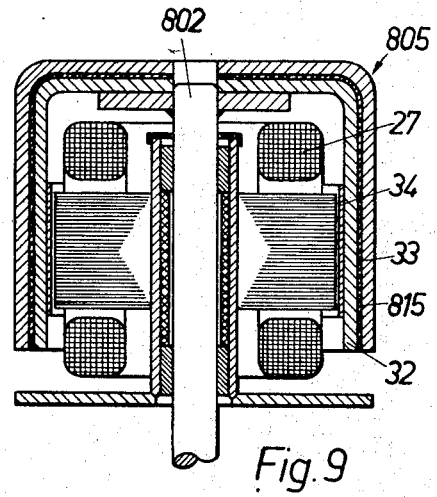
Fig. 9
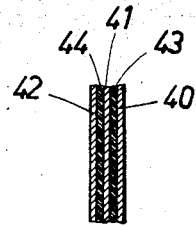
Fig. 11
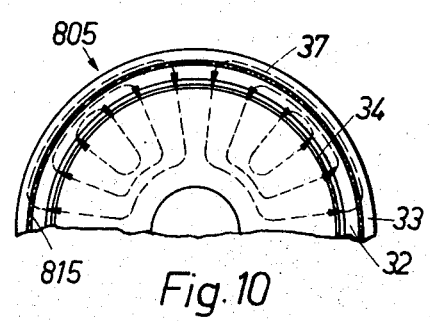
Fig. 10

United States Patent Office 3,527,969
Patented Sept. 8, 1970

3,527,969
SOUNDPROOFED HOUSING FOR ELECTRIC MOTORS
Hermann Papst, Saint Georgen, Germany, assignor to Papst-Motoren KG, Saint Georgen, Black Forest, Germany
Filed Oct. 28, 1968, Ser. No. 773,976
Claims priority, application Germany, Oct. 27, 1967, 1,613,343
Int. Cl. H02k 5/02, 5/24, 5/14
U.S. Cl. 310—51                                18 Claims

ABSTRACT OF THE DISCLOSURE

A housing for compact electric motors which comprises one or more layers of metallic material and one or more liners of preferably synthetic soundproofing material. At least one layer consists of ferromagnetic material and the liner is applied to the inner and/or outer side of such layer. The ferromagnetic material serves, inter alia, as a conveyor for the magnetic force lines of the motor. The housing may include, a cup-, disk-, bell- or similarly shaped body portion, and a cover of the same materials as the main body portion. The soundproofing liner need not be coextensive with the main body portion to provide valuable soundproofing characteristics.

BACKGROUND OF THE INVENTION

The present invention relates to electric motors in general, especially to compact or miniature electric motors for use in typewriters, tape recorders or the like, and more particularly to improvements in housings or frames for such electric motors. Still more particularly, the invention relates to improvements in soundproofing or sound deadening characteristics of housings or frames for small electric motors.

Shaking forces which develop in response to vibration of the housing and/or shaft in a small electric motor often contribute to generation of noise which is more disturbing than direct radiation of sound from the housing. Vibration of the housing and/or shaft is often communicated to bulky parts of the driven apparatus which produce additional noise and/or cause further propagation of mechanical vibrations. Attempts to reduce or eliminate vibrations include the provision of elastic cushioning, supporting and suspending elements which contribute considerably to the initial and maintenance cost. In many instances, the motor must be provided with two housings one of which is mounted in or on elastic cushions and the other of which is rigid with a suitable support.

Noises which are generated by the motor proper are deadened or reduced by encapsulation into housings consisting of materials having a low dynamic elasticity. If the motor requires cooling, its housing must be provided with one or more openings and with feed tubes or like acoustic sealing means for such openings. All of these sound deadening or noise-reducing procedures involve considerable expenditures in material, space and man hours. The same holds true if the customary design of such motors is changed for the sole purpose of reducing or eliminating noise.

SUMMARY OF THE INVENTION

One of several important objects of my invention is to provide a novel and improved housing for electric motors, particularly for compact electric motors, whose vibration damping and sound deadening characteristics are superior to those of conventional housings.

Another object of the invention is to provide a housing which can be produced and assembled at a low cost, which can be employed in motors wherein the rotor surrounds the stator or vice versa, and which—in addition to its superior sound deadening characteristics—can also perform one or more additional important and advantageous functions.

A further object of the invention is to provide a housing whose noise-reducing and vibration-damping characteristics are not unduly affected by its size and/or shape and which can be mass-produced in available machinery.

An additional object of the invention is to provide a housing which is less likely to or less capable of communicating vibratory movements to adjoining parts than the housings of conventional motors.

Basically, the improved housing comprises at least one layer of metallic material (preferably a ferromagnetic sheet material which can serve as a conductor for magnetic force lines) and at least one liner of preferably synthetic plastic soundproofing material which is preferably thin and is applied to the inner or to the outer side of the metallic layer. By employing a layer of ferromagnetic material, I insure that the housing performs several important functions, namely, it protects and encloses the sensitive parts of an electric motor, it serves as a conveyor for some or all of the magnetic force lines needed for proper operation of the motor, and it also reduces or eliminates noise.

The housing may comprise $n+1$ metallic layers and $n$ liners of butyl rubber, cold flowing polyisobutylene and/or other suitable sound deadening or sound absorbing material, and each of its liners is preferably sandwiched between two metallic layers.

If the housing comprises a cupped, dished, bell-shaped or tubular main body portion and a cover portion, the latter preferably consists of the same materials as the main body portion. The main body portion can be produced by deep drawing, rolling, bending and/or a combination of several metal shaping techniques. The liner or liners can be applied to one or more metallic layers during shaping of the portions of my housing or such portions can be produced from prefabricated laminated stock including one or more metallic layers and one or more soundproofing liners.

The novel features which are considered as characteristic of the invention are set forth in particular in the appended claims. The improved housing itself, however, both as to its construction and the mode of assembling the same, together with additional features and advantages thereof, will be best understood upon perusal of the following detailed description of certain specific embodiments with reference to the accompanying drawing.

BRIEF DESCRIPTION OF THE DRAWING

FIG. 1 is an axial sectional view of an electric D-C motor having a two-piece housing which embodies one form of the invention;

FIG. 2 is an axial sectional view of a similar second two-piece housing;

FIG. 3 is an end elevational view of the tubular main body portion of a third housing;

FIG. 3a is a side elevational view of the main body portion shown in FIG. 3;

FIG. 4a is a fragmentary axial sectional view of a fourth housing;

FIG. 4b is a similar fragmentary axial sectional view of a fifth housing constituting a modification of the housing shown in FIG. 4a;

FIG. 5a is a fragmentary axial sectional view of a sixth housing;

FIG. 5b is a similar fragmentary axial sectional view of a seventh housing constituting a modification of the housing shown in FIG. 5a;

FIG. 5c is a similar fragmentary axial sectional view of an eighth housing which constitutes a modification of the housings shown in FIGS. 5a and 5b;

FIG. 6a is a fragmentary axial sectional view of a ninth housing;

FIG. 6b is a similar fragmentary axial sectional view of a tenth housing which constitutes a modification of the housing shown in FIG. 6a;

FIG. 7a is a fragmentary axial sectional view of an electric motor which comprises a rotary housing;

FIG. 7b is a similar fragmentary axial sectional view which comprises a housing constituting a modification of the rotary housing shown in FIG. 7a;

FIG. 8 is an axial sectional view of an electric motor which comprises a different rotary housing;

FIG. 9 is an axial sectional view of a similar electric motor but comprising a modified rotary housing;

FIG. 10 is a fragmentary end elevational view of a portion of the motor shown in FIG. 9; and FIG. 11 is a fragmentary axial sectional view of a housing which comprises several soundproofing liners.

DESCRIPTION OF THE PREFERRED EMBODIMENTS

Referring first to FIG. 1, there is shown a small electric motor which can be used in a portable typewriter, office typewriter, tape recorder or a similar apparatus wherein the generation of noise is undesirable or bothersome. The motor comprises a rotor 1 affixed to a shaft 2 which is rotatable in bearings 3 and 4 respectively provided in the cupped main body portion 5 and in a disk-shaped cover portion 6 of a novel housing. The cover portion 6 is fitted into the open end of the main body portion 5. The latter accommodates and supports permanent magnets 7 which produce the magnetic field. The winding 8 of the rotor 1 is connected with a collector 10 by way of conductors 9. The collector 10 rotates with reference to slitted brushes 11 of sheet metal which are affixed to insulators 12 provided at the inner side of the cover portion 6.

In accordance with a feature of my invention, both portions of the housing consist of two layers 13, 14 of metallic material (which is a ferromagnetic sheet material which serves as a conductor for the majority of magnetic force lines produced by radially magnetized magnets 7) and a liner 15 of soundproofing or sound deadening material which is sandwiched between the metallic layers. By employing layers of ferromagnetic sheet material, I insure that the improved housing performs several important functions, namely, that of serving as a conductor for magnetic force lines, that of protecting the rotor and other sensitive parts of the motor, and that of reducing or eliminating noise. If desired, one of the layers 13, 14 may consist of a metallic material (for example, sheet aluminum or an aluminum alloy) whose magnetic properties are inferior to those of ferromagnetic materials.

FIG. 2 illustrates a second housing including a main body portion 105 and a cover portion 106. The main body portion 105 is produced by deep drawing. Its liner 115 is sandwiched between two metallic layers 113, 114 and such metallic layers consist of ferromagnetic material. The cover portion 106 can be simply fitted into or permanently bonded to the open end of the main body portion 105, and this cover portion also comprises a soundproofing liner between two metallic layers.

When a electric motor requires a relatively long housing, the main body portion of such a housing may constitute an open-ended tube 205 shown in FIGS. 3 and 3a. The tube may be formed by bending or rolling of a prefabricated laminated structure which comprises at least one inner roll or layer 213 of metallic material and at least one outer roll or layer 214 of metallic material. In order to prevent weakening of the housing and/or to further improve the soundproofing characteristics of such housing, the edge portions of the inner layer 213 preferably meet or extend close to each other in a region 213a which is angularly offset with reference to the region 214a where the edge portions of the outer layer 214 abut or approach each other. In other words, the outer layer 214 overlies the edge portions of the inner layer 213, and vice versa.

When the housing of an electric motor radiates sound in an axial direction (as indicated by arrows 20 in FIGS. 4a and 4b), the cover portion 306 or 306A preferably overlies the adjoining edge face of the main body portion 305 or 305A. In FIG. 4a, the soundproofing liner of the cover portion 306 is segregated from the soundproofing liner of the main body portion 305 by the inner metallic layer of the cover portion. In FIG. 4b, the inner metallic layers of the cover portion 306A and main body portion 305A are trimmed in such a way that the two soundproofing liners abut against each other.

If the sound is propagated mainly in the radial direction (arrows 21), the housing is preferably constructed and assembled in a manner as shown in FIGS. 5a, 5b and 5c. In FIG. 5a, the cover portion 406 is fitted in its entirety into the open end of a cylindrical main body portion 405 and the two sound absorbent liners are out of contact with each other. In FIG. 5b, the inner metallic layer of the main body portion 405A is cut off at the end so that the liners of the main body portion and cover portion 406A are in contact with each other. In FIG. 5c, the entire circumferential surface of the cover portion 406B is in abutment with the sound absorbent liner of the main body portion 405B.

FIGS. 6a and 6b illustrate two housings wherein parts of the main body portion and cover portion are normally separated from each other by narrow gaps to allow for some expansion. In FIG. 6a, the inner metallic layer and the sound absorbent liner of the main body portion 505 are shortened at the open end, and the inner metallic layer of the cover portion 506 abuts against and is preferably bonded to the inner metallic layer of the main body portion 505A. In FIG. 6a, the liner of the main body portion 505 can expand in the axial direction; in FIG. 6b, the liner of the cover portion 506A can expand in the radial direction.

Referring to FIG. 7a, there is shown an electric motor whose housing comprises a cylindrical main body portion 605 forming part of the rotor and having a central part 22 which constitutes the outermost part of a rotor package 23. The open end of the main body portion 605 constitutes a cylinder 24 which comprises two cylindrical layers of metallic material and a central liner of sound absorbent material. The cylinder 24 surrounds the adjoining portion of the rotor package 23. In FIG. 7b, the cylinder 24' comprises a shortened inner metallic layer which abuts against the adjoining outermost lamination of the rotor package 23. The cover portions of the housings shown in FIGS. 7a and 7b are respectively denoted by numerals 606 and 606A.

It was found that housings of the type shown in FIGS. 7a and 7b contribute significantly to a reduction in noise even though the soundproofing material does not fully enclose the remaining parts of the motor, i.e. even though such soundproofing material is embodied only in that part of the main body portion which is adjacent to its open end. In FIGS. 7a and 7b, the broken lines 24a and 24a' respectively indicate that the main body portion 605 and 605A may include a laminated cylinder which respectively replaces the cylinder 24 or 24' and extends along the full axial length of the corresponding main body portion.

FIG. 8 shows an electric motor wherein the main body portion 705 of the housing also rotates about the axis of a shaft 702. The main body portion 705 forms part of, constitutes or is connected with the rotor. The laminations 26 and the windings 27 of the stator are accommodated in the main body portion 705. The cover portion is shown at 706. The bottom wall of the main body portion 705 is glued or otherwise affixed to a flange 28 which is rigid with the shaft 702. The latter is journalled in bearing sleeves 30 and 31. The main body portion 705 and the cover portion 706 comprise two layers of ferromagnetic material which surround a liner of sound absorbent material. Nearly all magnetic force lines of the magnetic field produced by the winding 27 pass through the ferromagnetic layers of the main body portion 705. The disk-shaped cover portion 706 is mounted at its center so that its peripheral portion can vibrate to thus produce an additional sound deadening effect. If desired or necessary, at least one layer of the main body portion 705 and/or cover portion 706 may consist of an aluminum alloy or other non-ferromagnetic material.

The electric hysteresis motor of FIG. 9 is similar to the motor of FIG. 8. The cup-shaped main body portion 805 of the housing is mounted on the shaft 802 and comprises a relatively thick inner layer 32 of ferromagnetic material, a liner 815 of sound absorbent material which surrounds the layer 32, an outer layer 33 of ferromagnetic material or nonferromagnetic material (e.g., aluminum, aluminum alloy or another good conductor of electric current), and a thin cylindrical third layer 34 of hysteresis material which is directly surrounded by (e.g., telescoped into) the layer 32. For example, the layer 34 may consist of barium ferrite.

FIG. 10 illustrates the path of magnetic force lines 37 in the main body portion 805 of FIG. 9. Such magnetic force lines pass from the winding 27 and through the layers 32, 33, it being assumed that the layer 33 consists of ferromagnetic material. The force lines pass substantially radially through the layer 34 so that the latter is magnetized in a radial direction. The layer 34 is preferably thin because it need not be magnetized in circumferential direction, i.e., the path of magnetic force lines can extend through the ferromagnetic layer or layers of the main body portion 805.

FIG. 11 shows a portion of a housing which comprises three layers 40, 41, 42 of ferromagnetic material and two liners 43, 44 of sound-absorbent material, e.g., butyl rubber or cold flowing polyisobutylene. Each of the two liners 43, 44 is sandwiched between two metallic layers. The structure of FIG. 11 can form part of a main body portion or of a cover portion.

The improved housing has been found to be of particular advantage for use in electric motors which are built into sound recording and/or reproducing apparatus wherein noise produced by the motor in close proximity to a microphone could affect the quality of sound recordal or reproduction. Another advantageous application of the improved housing is in electric motors for typewriters or other types of office and businesss machines wherein noise produced by the motor is likely to be irritating to the operator or to other persons working in areas where the machine or machines are put to use.

Vibrations which are noticeable in motors comprising conventional housing are reduced by utilization of main body portions and/or cover portions which consist of laminated sheet stock or sandwich construction, i.e., wherein two or more layers of metallic material are assembled with one or more liners of soundproofing material. The exact characteristics of the liner or liners depend on desired utilization of the motor, for example, on the temperature of surrounding air, on the frequency of use and/or other factors.

Noises or sounds induce vibrations of a solid metallic plate whereby the latter radiates sound energy. When the plate is replaced by a sandwich construction which comprises one or more soundproofing liners, vibrators of metallic layers subject the liner or liners to shearing stresses which are converted into heat energy to bring about a reduction in noise.

When the liner or liners consist of cold flowing polyisobutylene, such material can be applied to metallic layers in the form of an emulsion. A very thin coat of emulsion suffices to bring about highly effective soundproofing action. By employing suitable vulcanizing additives, the emulsion can be converted into butyl rubber. Alternatively, portions of the housing can be produced of prefabricated laminated sheet stock which comprises one or more soundproofing liners. Two or more liners of soundproofing material are employed when the motor is intended for use in sound recording or reproducing apparatus or for other utilizations where a substantial reduction or complete elimination of noise is of great importance. Additional reductions in noise can be achieved if the bottom wall of a cup-shaped main body portion is separated from the remainder of the main body portion and is subsequently secured to such remainder.

The improved housing need not be mounted in or on elastic cushions and it preferably employs a minimum of magnetically inactive material. Moreover, the improved housing contributes to dissipation of heat. Finally, the improved housing can be employed as a housing of an electric motor to serve as a soundproofing means and as a shield for the motor proper.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. A housing for electric motors, comprising two layers of metallic material, and at least one liner of soundproofing material sandwiched between said layers.

2. A housing as defined in claim 1, wherein at least one of said layers consists of ferromagnetic sheet material.

3. A housing as defined in claim 1, one of said layers having an inner side and the other of said layers having an outer side facing said inner side; and wherein said liner is a coating provided on at least a portion of one of said sides and thereby sandwiched between said layers.

4. A housing as defined in claim 1, comprising a cupped main body portion which includes said layer and said liner.

5. A housing as defined in claim 4, wherein said main body portion has an open end; and further comprising a cover portion for said open end and including at least one layer of ferromagnetic material and at least one liner of soundproofing material.

6. A housing as defined in claim 1, wherein said liner consists of synthetic plastic material.

7. A housing as defined in claim 1, wherein said liner consists of a cold-flowing synthetic plastic material.

8. A housing as defined in claim 6, wherein said synthetic plastic material is selected from the group consisting of butyl rubber and polyisobutylene.

9. A housing for electric motors, comprising $n+1$ layers of metallic material and $n$ liners of soundproofing material, each of said liners being sandwiched between two of said layers and $n$ being a whole multiple of one.

10. A housing for electric motors, comprising a tubular main body portion including two layers of metallic material and a liner of soundproofing material sandwiched between said layers, each of said layers consisting of a roll of convoluted sheet stock having closely adjacent longitudinal edge portions, and the edge portions of one of said layers being angularly offset with reference to the edge portions of the other layer so that each of said layers overlies the edge portions of the other layer.

11. A housing for electric motors, comprising two portions each of which includes two layers of metallic material and a liner of soundproofing material sandwiched between the respective layers, one layer of one of said portions being bonded to one layer of the other of said portions.

12. A housing for electric motors, comprising a rotary portion including a substantially cylindrical part having an open end, said cylindrical part comprising two layers of metallic material and a liner of soundproofing material sandwiched between said layers.

13. A housing for electric motors, comprising two layers of metallic material, one of said layers consisting of ferromagnetic sheet material and the other of said layers consisting of non-ferromagnetic material; and a liner of soundproofing material sandwiched between said layers.

14. A housing as defined in claim 13, wherein said other layer consists of non-ferromagnetic material which is a good conductor of electric current.

15. A housing as defined in claim 14, wherein said other layer consists of aluminum.

16. A housing as defined in claim 14, wherein said liner surrounds said one layer; and further comprising a third layer of hysteresis material directly surrounded by said one layer.

17. A housing as defined in claim 16, wherein said third layer constitutes a radially magnetized cylinder.

18. A housing for electric motors, comprising two layers of ferromagnetic metallic material, and a liner of soundproofing material sandwiched between said layers.

References Cited

UNITED STATES PATENTS

| | | | |
|---|---|---|---|
| 1,476,776 | 12/1923 | Stamm et al. | 310—51 X |
| 1,688,891 | 10/1928 | Spreen | 310—51 |
| 2,272,985 | 2/1942 | Smith | 230—117 |
| 2,281,858 | 5/1942 | Pierce | 15—413 |
| 2,874,008 | 2/1959 | Orte et al. | 310—51 X |
| 2,886,721 | 5/1959 | Picozzi et al. | 310—51 |

WARREN E. RAY, Primary Examiner

U.S. Cl. X.R.

310—43, 45, 67, 89

REEXAMINATION CERTIFICATE (336th)
United States Patent [19]
Papst

[11] B1 3,527,969

[45] Certificate Issued  Apr. 16, 1985

[54] SOUNDPROOFED HOUSING FOR ELECTRIC MOTORS

[75] Inventor: Hermann Papst, Saint Georgen, Fed. Rep. of Germany

[73] Assignee: Papst-Motoren KG, Saint Georgen, Fed. Rep. of Germany

Reexamination Request:
No. 90/000,522, Mar. 7, 1984

Reexamination Certificate for:
| | |
|---|---|
| Patent No.: | 3,527,969 |
| Issued: | Sep. 8, 1970 |
| Appl. No.: | 773,976 |
| Filed: | Oct. 28, 1968 |

[30] Foreign Application Priority Data

Oct. 27, 1967 [DE]  Fed. Rep. of Germany .... 16 13 343

[51] Int. Cl.³ .......................... H02K 5/02; H02K 5/24; H02K 5/14
[52] U.S. Cl. ...................................... 310/51; 310/43; 310/45; 310/67; 310/89
[58] Field of Search .......................... 310/51, 216–218, 310/43–45, 67

[56] References Cited

U.S. PATENT DOCUMENTS

| | | | |
|---|---|---|---|
| 1,877,569 | 9/1932 | Falkenthal | 310/45 UX |
| 1,992,822 | 2/1935 | Granfield | 310/216 X |
| 2,667,591 | 1/1954 | Gindroz | 310/45 X |
| 2,945,138 | 7/1960 | Strang | 310/51 UX |

FOREIGN PATENT DOCUMENTS

| | | | |
|---|---|---|---|
| 931682 | 8/1955 | Fed. Rep. of Germany . | |
| 41173 | 5/1956 | Fed. Rep. of Germany . | |
| 1613456 | 4/1971 | Fed. Rep. of Germany . | |
| 1166950 | 11/1958 | France | 310/51 |
| 167282 | 5/1934 | Switzerland . | |

OTHER PUBLICATIONS

Oberst, H., "Neue Werkstoffe zur Lärmbekämpfung", in Wärme–Kälte–Schall, 4–5/1961, pp. 35–40.
Schommer, A., "Entdröhnung von Blechkonstruktionen nach der . . .", Special Reprint from Klepzig Fachberichte, 1966, vol. 7, pp. 301–309.
Ungar, E. E., "Damping Tape for Vibration Control", Product Engineering, Jan. 25, 1960, pp. 57–62.
Schommer, A., "Schwingungsgedämpfte Verbundbleche im Bauwesen", pp. 1–4, (Reprint of Kunststoffe im Bau", vol. 4/1966, pp. 75–78).
Koch, Paul, "Konstruktionsrichtlinien und Verarbeitungsmöglichkeiten an schwingungsgedämpften Verbundblechen mit . . .", (four pages numbered 1–4, but identified at the end of page 4 as being a Special Reprint taken from the periodical Klepzig Fachberichte, vol. 8/1966, pp. 347–350, published by L. A. Klepzig Verlag, of Friedrichstr. 112, Düsseldorf, Fed. Rep. of Germany).
Koch, P. et al., "Verbundsysteme aus Stahlblechen mit . . .", pp. 5–17, in HOESCH Berichte aus Forschung . . ., vol. 1/67.
Europäische Technische Informationen, vol. 5/6, 1965, p. 121.

Primary Examiner—Donovan F. Duggan

[57] ABSTRACT

A housing for compact electric motors which comprises one or more layers of metallic material and one or more liners of preferably synthetic soundproofing material. At least one layer consists of ferromagnetic material and the liner is applied to the inner and/or outer side of such layer. The ferromagnetic material serves, inter alia, as a conveyor for the magnetic force lines of the motor. The housing may include, a cup-, disk-, bell- or similarly shaped body portion, and a cover of the same materials as the main body portion. The soundproofing liner need not be coextensive with the main body portion to provide valuable soundproofing characteristics.

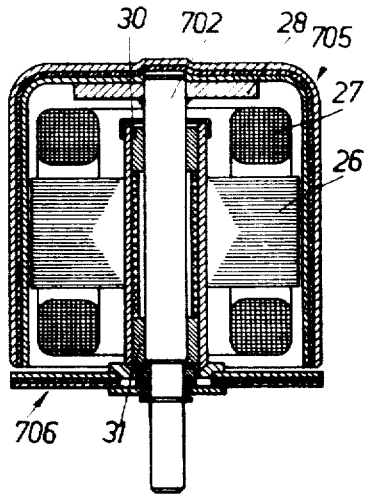

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-18 are cancelled.

New claims 19-37 are added and determined to be patentable.

*19. An external-rotor motor having an improved motor housing, the motor comprising an internal, wound stator and an external, non-wound rotor, the stator and rotor together defining a generally cylindrical air gap, the improved motor housing comprising*

*a rotatable, cupped main body portion forming part of the rotor and having an open end,*

*a stationary, generally disk-like cover portion secured to the stator and positioned at said open end,*

*the cupped main body portion and the cover portion each comprising at least one respective layer of a flux-conducting ferromagnetic material through which pass magnetic lines of force of the magnetic field produced by the wound stator,*

*nearly all magnetic force lines of the magentic field produced by the wound stator passing generally radially through said air gap and thus through the layer of flux-conducting ferromagnetic material of the cupped main body portion, stray lines of magnetic force accordingly passing through the layer of flux-conducting ferromagnetic material of the cover portion,*

*at least one of said portions of the motor housing comprising a plural-layer sandwich which includes two layers of metallic material of which one is said respective layer of a flux-conducting ferromagnetic material, and a liner of soundproofing material sandwiched between the layers of metallic material.*

*20. The motor as defined in claim 19,*
*the cupped main body portion of the motor housing having an axis of rotation,*
*the cover portion being spaced from the open end of the cupped main body portion in the axial direction of the latter.*

*21. The motor as defined in claim 20,*
*the cupped main body portion including a cylindrical part which has an inner peripheral radius and an outer peripheral radius,*
*the cover portion extending radially relative to the axis of the cupped main housing portion and extending radially outwardly beyond the inner peripheral radius of the latter.*

*22. The motor as defined in claim 21,*
*the cover portion extending radially outwardly beyond the inner peripheral radius of the cupped main body portion but not extending radially outwardly beyond the outer peripheral radius of the cupped main body portion.*

*23. The motor as defined in claim 21,*
*the cover portion having a radially inner part and a radially outer part,*
*the radially inner part being separated from the outer periphery of the open end of the cupped main body portion by free space only.*

*24. The motor as defined in claim 19, the cover portion comprising said plural-layer sandwich.*

*25. The motor as defined in claim 20, the cover portion comprising said plural-layer sandwich.*

*26. The motor as defined in claim 21, the cover portion comprising said plural-layer sandwich.*

*27. The motor as defined in claim 23, the cover portion comprising said plural-layer sandwich.*

*28. The motor as defined in claim 26, the liner of the sandwich of the cover portion being a single continuous layer of soundproofing material.*

*29. The motor as defined in claim 28, the liner of the sandwich of the cover portion being substantially coextensive with at least one of the two metallic layers of the sandwich.*

*30. The motor as defined in claim 29, the liner of the sandwich of the cover portion being substantially coextensive with the layer of ferromagnetic material of the sandwich.*

*31. The motor as defined in claim 28, the liner of the sandwich of the cover portion being present between the metallic layers of the sandwich at places which are located at opposite sides of said axis of rotation of the cupped main body portion.*

*32. The motor as defined in claim 26, the liner of the sandwich of the cover portion being present between the metallic layers of the sandwich at places which are located at opposite sides of said axis of rotation of the cupped main body portion.*

*33. The motor as defined in one of claims 19-27,*
*the cover portion including a central part and an outer peripheral part,*
*the cover portion being secured to the remainder of the motor only at the central part of the cover portion whereby to permit relative vibration as between the central part of the cover portion and the outer peripheral part thereof to thus produce an additional sound deadening action.*

*34. The motor as defined in one of claims 28-32, the two layers of metallic material of the plural-layer sandwich of the cover portion being everywhere out of physical contact with each other.*

*35. The motor as defined in one of claims 28-32, the two layers of metallic material of the plural-layer sandwich of the cover portion being unconnected to each other in the space intermediate these two layers of metallic material.*

*36. The motor as defined in claim 19, the cupped main body portion comprising said plural-layer sandwich.*

*37. The motor as defined in claim 19, both the cupped main body portion and the cover portion comprising said plural-layer sandwich.*

* * * * *